United States Patent [19]
Roach

[11] Patent Number: 5,122,211
[45] Date of Patent: Jun. 16, 1992

[54] METHOD FOR FORMING THERMOPLASTIC COMPOSITE FILAMENT INTO A STRUCTURE

[75] Inventor: Henry P. Roach, Canoga Park, Calif.
[73] Assignee: Heat Transfer Technologies, Inc., Sun Valley, Calif.
[21] Appl. No.: 419,650
[22] Filed: Oct. 11, 1989
[51] Int. Cl.$^5$ .............................................. B29C 41/40
[52] U.S. Cl. ..................................... 156/173; 156/178; 264/281; 264/290.5; 264/171; 264/518
[58] Field of Search ............. 156/173, 172, 166, 167, 156/174, 175, 178, 169; 264/281, 280, 517, 518, 134, 135, 136, 137, 290.5, 292, 171, 172, 173, 174

[56] References Cited
U.S. PATENT DOCUMENTS

| | | | |
|---|---|---|---|
| 3,148,102 | 9/1964 | Eakins | 156/173 |
| 3,607,501 | 9/1971 | Okumura | 156/173 |
| 3,783,068 | 1/1974 | Brown | 156/173 |
| 3,874,972 | 4/1975 | Wesgh | 156/173 |
| 3,933,557 | 1/1976 | Pall | 156/173 |
| 4,368,124 | 1/1983 | Brumfield | 156/173 |
| 4,724,669 | 2/1988 | Kanehira | 156/173 |
| 4,838,971 | 6/1989 | Cacak | 156/173 |

Primary Examiner—Jay H. Woo
Assistant Examiner—J. F. Durkin, II
Attorney, Agent, or Firm—Gene W. Arant

[57] ABSTRACT

An applicator is utilized in applying a thermoplastic composite filament to a mandrel so as to form a structure. The filament and the surface of the mandrel are caused to move simultaneously and in a common direction relative to the applicator so that the filament is continuously fed from the applicator into engagement with the surface of the mandrel. At least one stream of heated fluid is applied to the filament so that it impinges thereon not only at a location preceding the location of the applicator, but also along the length of the filament to and beyond the applicator and up to and including the region where the filament first comes into contact with the mandrel. At the same time a stream of heated fluid is applied directly to the surface of the mandrel within that region so that the mandrel is heated prior to being contacted by the filament.

5 Claims, 3 Drawing Sheets

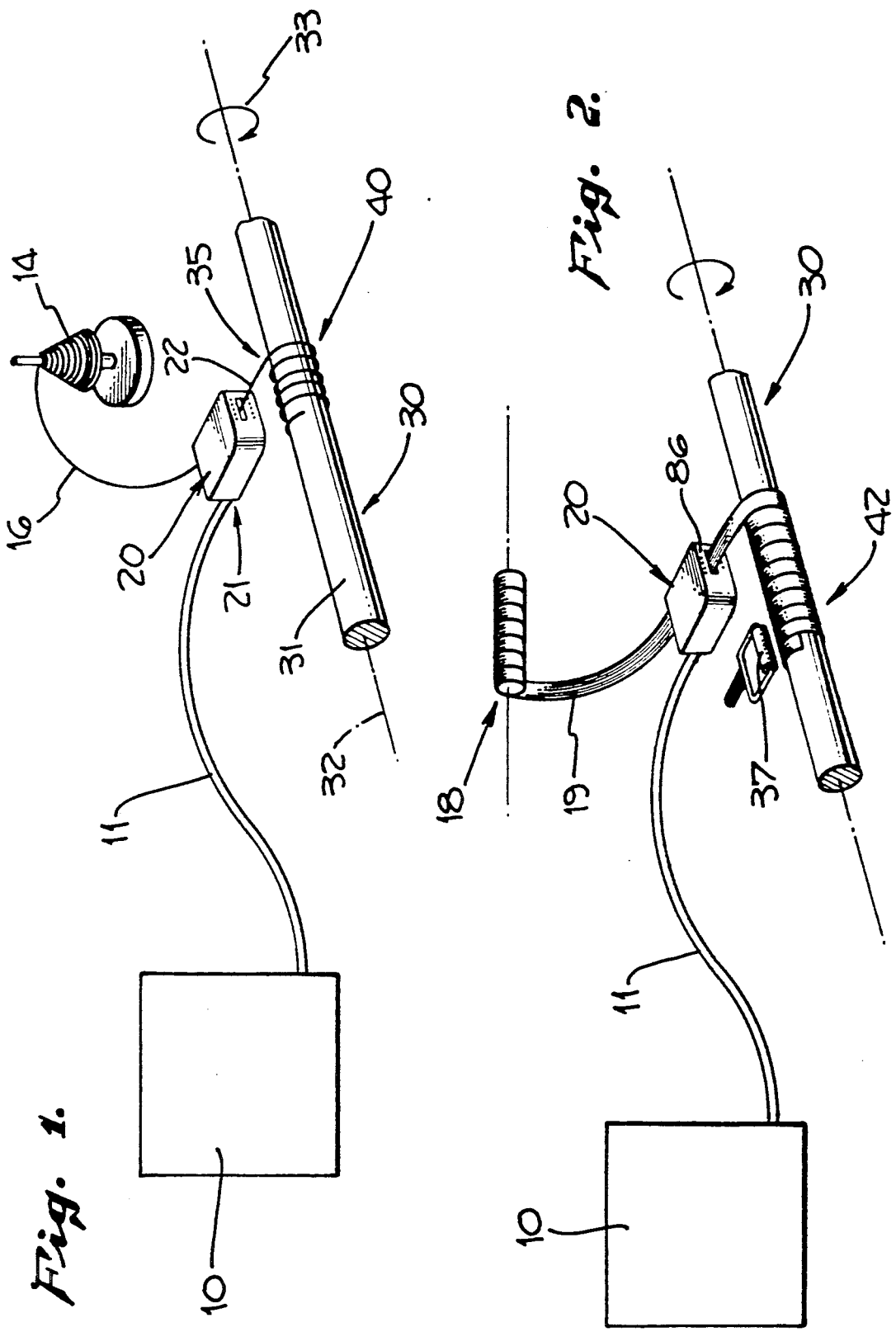

METHOD FOR FORMING THERMOPLASTIC COMPOSITE FILAMENT INTO A STRUCTURE

BACKGROUND OF THE INVENTION

Composite materials are widely used to create structures that are light in weight, have great strength, and can resist high temperatures. The basic structural member is a filament or yarn which includes both a reinforcement fiber such as graphite, and another fiber that provides a matrix for supporting and positioning the reinforcement fiber.

In past years a thermoset epoxy resin has been commonly used as the matrix fiber of the filament. The thermoset material becomes chemically and permanently cross-linked when exposed to heat, hence cold storage may be required prior to its use in manufacturing a part. Recent advancements in the technology, however, have made it possible to use a thermoplastic material instead of the thermoset. Thermoplastics merely undergo a reversible phase change, from solid to liquid, when exposed to elevated temperatures, and once cooled, the thermoplastic matrix returns to its original solid phase. Some significant advantages of the thermoplastic matrix are described in an article entitled "Thermoplastic/Graphite Fiber Hybrid Fabrics" published by the Society for the Advancement of Material and Process Engineering in the SAMPE Journal, Vol. 25, No. 1, January/February 1989. Thus, the thermoplastic composite (or TPC) filament is now widely used in the industry.

A structure or part is typically created by a preliminary formation, and by then heating it in an oven to form the final part which when cooled has the rigidity of titanium or steel. That procedure can become very cumbersome and expensive, however, particularly where articles of large size are being formed.

The present invention relates to a method and apparatus for forming structures or parts from composite material, without the use of an oven, and in particular, relates to forming them from thermoplastic composite (or TCP) filament.

SUMMARY OF THE INVENTION

According to the present invention a thermoplastic composite filament is utilized in conjunction with an applicator and a mandrel to form a structure when the filament has cooled, and in a manner which facilitates the creation of the desired final form of the structure without the necessity of its being heated in an oven.

According to the method of the present invention, the filament and the surface of the mandrel are caused to move simultaneously and in a common direction relative to the applicator so that the filament is continuously fed from the applicator into engagement with the surface of the mandrel or mold. At least one stream of heated fluid is applied to the filament so that it impinges thereon not only at a location preceding the location of the applicator, but also along the length of filament to and beyond the applicator and up to and including the region where the filament first comes into contact with the mandrel. Concurrently, a stream of heated fluid is applied directly to the surface of the mandrel within that same region, so that the surface of the mandrel is heated prior to being contacted by the filament and the filament when cooled assumes the desired final form of the structure.

In the preferred form of the invention the filament, as it travels through and beyond the applicator, is subjected to heated fluid which moves transversely to the filament, in somewhat of a criss-cross path, so that the impingement of the heated fluid accomplishes a maximum amount of heat transfer into the filament.

Further according to the preferred form of the invention, the applicator is made in the form of a nozzle, and the filament passes through the nozzle in a fairly straight-line path while the heated fluid that is heating the filament is forced to flow in somewhat of a criss-cross path so as to impinge in a transverse direction upon the filament.

BRIEF DESCRIPTION OF THE DRAWINGS

FIG. 1 is a perspective view of an apparatus assembly for applying a thermoplastic monofilament to a mandrel in accordance with the method of the present invention;

FIG. 2 is a perspective view like FIG. 1, but showing the thermoplastic composite material in the form of a tape rather than a single filament, and also showing the use of a roller to aid in the forming process;

DETAILED DESCRIPTION

Figure 3:
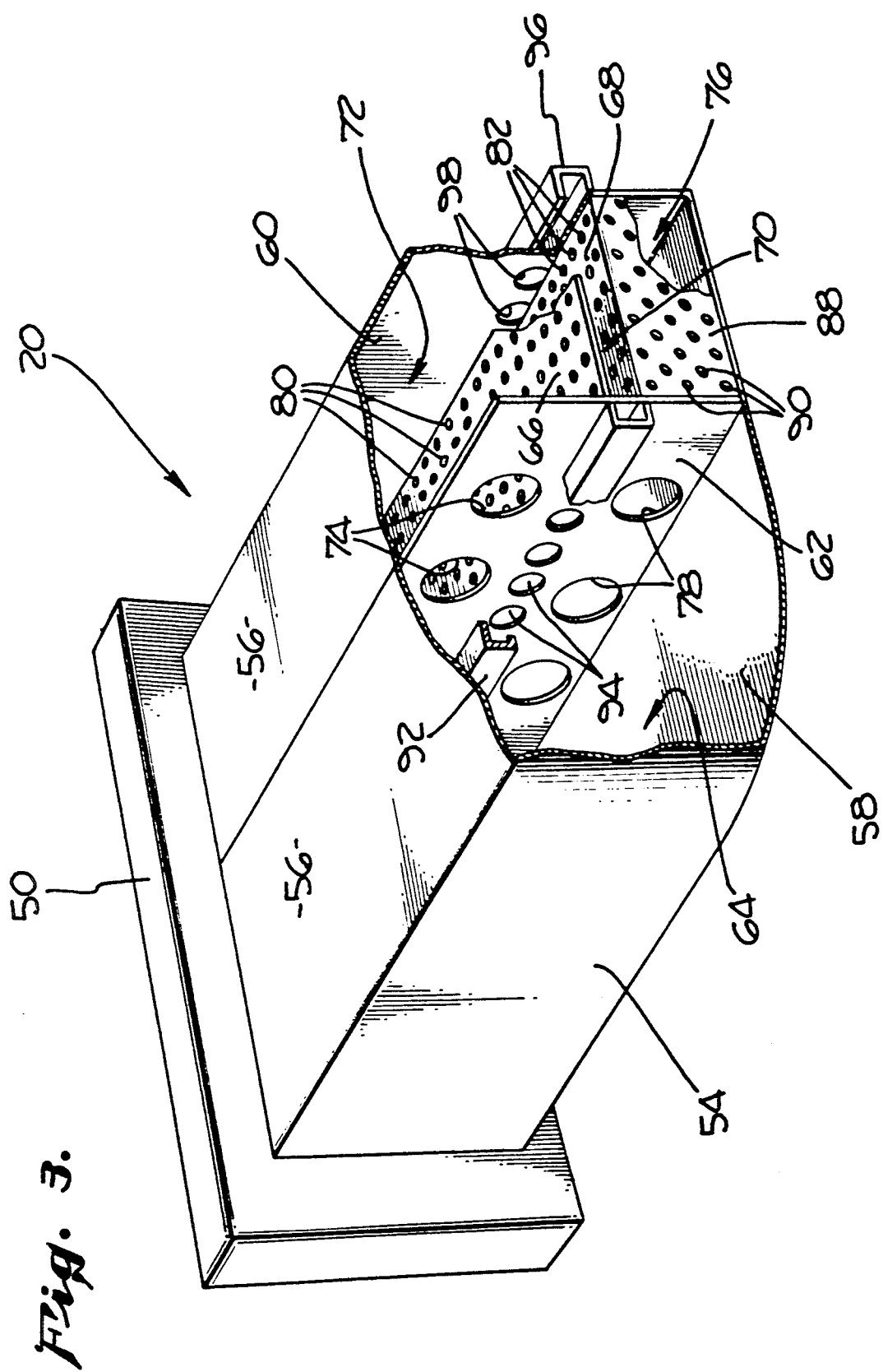
FIG. 3 is a perspective view of the presently preferred form of nozzle for carrying out the invention.

Reference is now made to the drawings, FIGS. 1 through 4, inclusive, which illustrate in detail the method of the present invention and the apparatus by which it is carried out.

As shown in FIG. 1, a source 10 supplies heated air to a tube or pipe 11. The source 10 is preferably a Moen temperature control system of the type disclosed in U.S. Pat. Nos. 4,386,650 and 4,535,222. That system generates pressurized, heated air and has the ability to control the temperature level of the air output within about five degrees Fahrenheit. The hot compressed air is then fed through the tube or pipe 11 to a nozzle 20, which is of a unique design in accordance with the present invention.

The nozzle 20 has a rearward or input end 21 and a mouth or exit port 22. At its input end the nozzle is adapted to receive both a thermoplastic composite filament, and a stream of hot air for heating the filament. A source 14 having a form such as a spindle feeds a thermoplastic composite monofilament 16 to the input end of nozzle 20. The thermoplastic filament includes a reinforcement fiber such as pure graphite, as well as another fiber of a thermoplastic material which provides a matrix for supporting and positioning the reinforcement fiber. Such filaments are known in the art and are described in published articles such as the SAMPE article listed above.

A mandrel or mold 30 preferably made of stainless steel has a cylindrical surface 31 and a longitudinal axis 32. A drive means schematically illustrated at 33 drives the mandrel in rotation about its axis. After an initial length of the filament 16 has been wound about the mandrel, the driven rotation of the mandrel then pulls the filament through the nozzle, so that the filament is then continuously fed onto the surface of the mandrel or mold. The mouth 22 of the nozzle is, in effect, an applicator, since it guides the application of the filament 16 onto the mandrel. After an initial length of the filament has been wound onto the mandrel there is no slippage, hence the filament and the surface of the mandrel then move simultaneously and in a common direction relative to the applicator.

As an alternate arrangement, a TEFLON-coated ring may be used to guide the filament onto the mandrel, hence the ring then becomes the applicator.

In accordance with the invention at least one stream of heated fluid is applied to the filament so that it impinges thereon not only at a location preceding the location of the applicator, but also along the length of the filament to and beyond the applicator and up to and including the region where the filament first comes into contact with the mandrel. At the same time a stream of heated fluid is applied directly to the surface of the mandrel within that region so that the mandrel is heated prior to being contacted by the filament. The region on the mandrel surface 31 where the filament first comes into contact with the mold is identified in FIG. 1 by the numeral 35. In accordance with the invention it is preferred to also apply heated air directly to that portion of the mandrel surface which has just received the filament. In that manner the heating, shaping, and cooling cycle of the thermoplastic matrix material is more effectively accommodated. The objective of the process is that the filament when cooled will assume the desired final form of the structure without the necessity of being heated in an oven.

In accordance with the embodiment of FIG. 1 the method and apparatus of the present invention are applied to the manufacture of a product 40, such as a pipe, which will have a cylindrical configuration. Although only a small number of loops about the mold are shown, it will be understood that the mandrel can also be reciprocated along its longitudinal axis in order to create a multi-layered final structure of the composite material.

Figure 4:
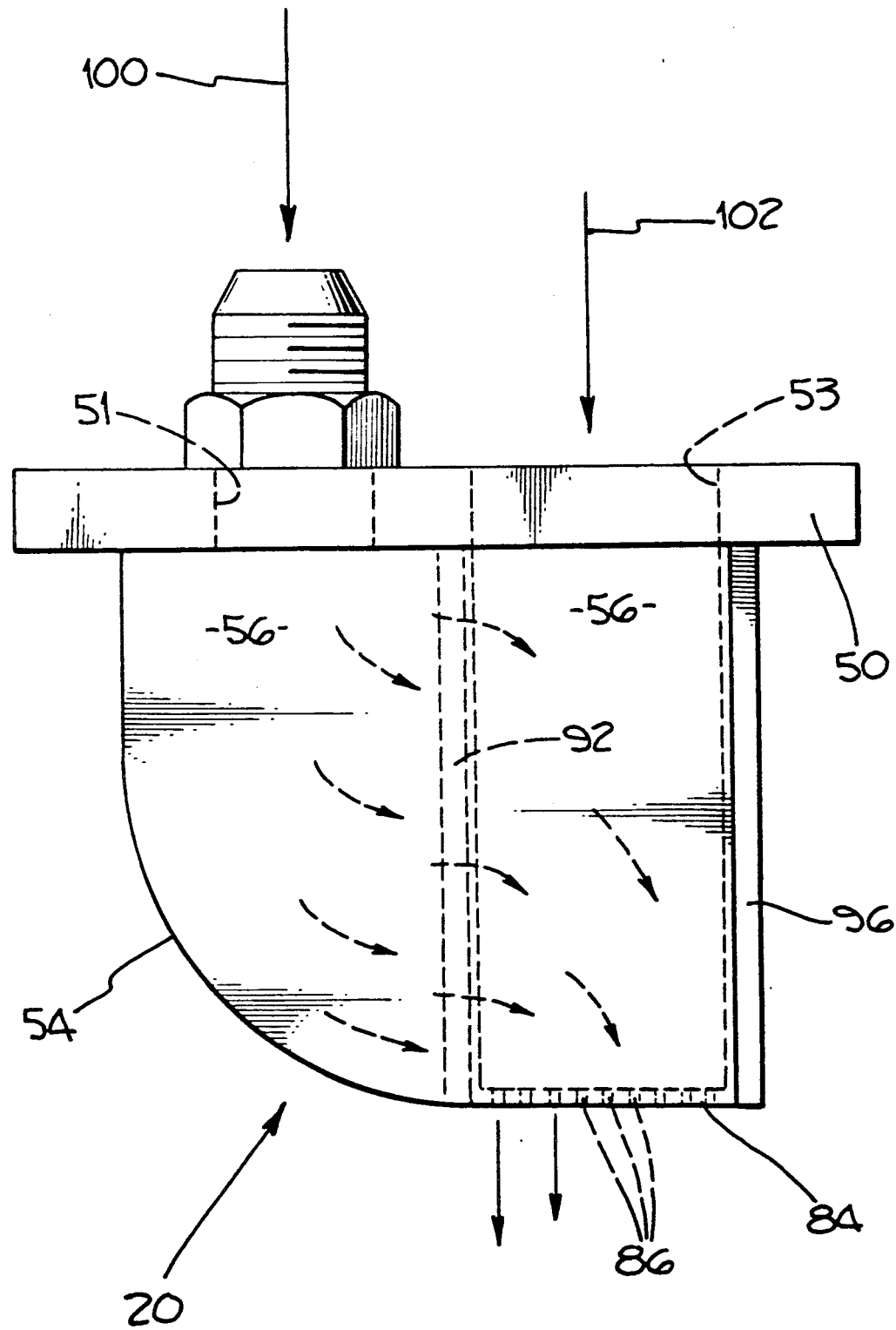
FIG. 4 is a top plan view of the nozzle, showing the air flow paths in dotted lines inside the nozzle and solid lines outside the nozzle.

The internal structure of the nozzle 22, and the flow of heated air streams therethrough, are shown in detail in FIGS. 3 and 4. Before describing the structure and operation of the nozzle in detail, however, reference is now made to FIG. 2 of the drawings.

The operation shown in FIG. 2 is much the same as that shown in FIG. 1, the main difference being that a tape 19 or ribbon rather than a filament 16 is the source of the composite material. The tape 19 consists of a large number of individual filaments 16 placed in a side-by-side relationship and secured together by adhesion of the thermosplastic matrix material. In FIG. 2 the tape source is designated as 18. The resulting structure 42 that is formed upon the mandrel 30 is a helically wound tape, rather than the helically wound single filament of FIG. 1.

Although the mandrel is shown as being of cylindrical configuration, there are other well known shapes which may also be utilized in driven rotation to form a product.

STRUCTURE AND OPERATION OF NOZZLE 20

Reference is now made to FIGS. 3 and 4 which illustrate the structure and mode of operation of the nozzle 20.

Nozzle 20 includes a base member 50 having an air entrance 51 therein as shown by dotted lines in FIG. 4, and also having a tape entrance 53 shown by dotted lines. The air entrance and the tape entrance are in side-by-side but spaced apart relationship. An air fitting 52 communicates with the air opening 51 and has the pipe or hose 11 attached to it. An arrow 100 indicates the supply of heated air that comes from the air supply 10 into the nozzle, while an arrow 102 indicates the path followed by tape 19 as it enters the nozzle.

On its left side as seen in the drawings the nozzle has a curved side wall 54. It also has flat top and bottom walls 56, 58, and a flat vertical right-hand side wall 60. Within its interior it has a dividing wall 62 which is parallel to side wall 60. As a result, the curved side wall 54, top and bottom walls 56, 58, and the dividing wall 62, form an air plenum 64 which receives the supply of heated air 100.

A pair of upper and lower horizontal walls 66, 68 extend between the dividing or center wall 62 and the right side wall 60, and are vertically separated by a short distance so as to form, in conjunction with those vertical walls, a main passageway 70. Tape 19 enters the main passageway through the tape entrance 53 and exits through the nozzle mouth 22, FIG. 1, which is the forward end of the main passageway. The space above the upper wall 66 and beneath the top wall 56 forms an upper auxiliary passageway 72, while the space below the lower wall 68 and bottom wall 58 forms a lower auxiliary passageway 76. Air flows from the plenum 64 into upper auxiliary passageway 72 through holes 74, and from the plenum 64 into lower auxiliary passageway 76 through holes 78.

The heated air then flows from upper auxiliary passageway 72 through holes 80 into the passageway 70, and through holes 82 into the main passageway. Thus, the heated air flowing along pathway 100 makes a left turn within the plenum 64, divides into upper and lower streams which enter the upper and lower auxiliary passageways, respectively, and then makes a right turn into the main passageway where it impinges transversely upon the tape 19. Holes 80 are dispersed throughout the upper wall 66 in a carefully triangulated pattern so as to apply the heated air to the entire surface of the tape 19. Holes 80 are deliberately made smaller than holes 74 in order to create increased velocity of the hot air as it strikes the tape. Holes 82 are smaller than holes 76 for the same reason.

The upper auxiliary passageway is closed off by a front wall 84 (shown only in dotted lines in FIG. 4) having even smaller holes 86 which allow the air to escape in a forward direction. In similar manner the upper auxiliary passageway is closed off by a front wall 88 (shown in solid lines in FIG. 3) having equally smaller holes 90 which allow the air to escape in a forward direction. As a result, the heated air travels into the main passageway 70 in a direction transverse to the tape 19 therein, and strikes the tape transversely at various points along the length of the main passageway, so as to maximize the heat transfer into the tape. It then travels both above and below the tape 19, and in the direction of its movement. If a monofilament is being used, or if the width of the tape is significantly less than the width of passageway 70, then the hot air streams will follow somewhat of a criss-cross path, impinging transversely upon the thermoplastic material more than once.

Additional structure of the nozzle 20 includes a left channel 92 member and a right channel member 96 which are attached on the outer sides of the vertical walls 62 and 60, respectively, to provide additional internal passageways. Channel member 92 receives air from main passageway 70 via holes 94, while channel member 96 receives air from main passageway 70 via holes 98. In general, the air flowing from the two channel members impinges directly upon the surface 31 of the mandrel within the region 35 that is initially contacted by the tape 19 as it is fed to the mandrel. More specifically, the air from one channel member impinges upon that portion of the mandrel surface which is about to be engaged by the tape, while air from the other channel member strikes that portion of the tape which has just been applied to the mandrel. The importance of this air flow is that it heats the mandrel surface to a temperature which is more nearly compatible with the tape temperature, and accommodates the heating, forming, and cooling cycle of the thermoplastic matrix material. The tape presently used reaches about 750 degrees Fahrenheit before the thermoplastic material softens to a sufficient extent to permit the matrix material to re-form into the desired final shape of the product.

ALTERNATIVE METHOD

Although it is presently preferred to apply heat to the filament or tape before it reaches the nozzle mouth 22, it is possible to use a modified form of apparatus in which heat is applied only to that portion of the filament or tape which has already passed the applicator. This form of the method may, however, result in some reduction of the speed with which the product is formed.

Although the method and apparatus of the present invention have been described in considerable detail in order to comply with the patent law, it will be understood that the scope of the invention is to be limited only in accordance with the appended claims.

What I claim is:

1. In the art of utilizing a composite filament that includes a graphite reinforcement fiber and a fiber of a thermoplastic material for supporting the reinforcement fiber, to form a structure of a desired shape upon a mandrel having a conforming surface configuration, the method of heating and forming the thermoplastic matrix material comprising the steps of:
   (a) selecting an applicator having an exit port for guiding the filament into contact with the surface of the mandrel;
   (b) causing the filament to move longitudinally through the exit port;
   (c) causing the surface of the mandrel to move simultaneously and in a common direction with that portion of the filament which has already passed through the exit port such that the filament is continuously fed into contact with the surface of the mandrel;
   (d) at a location preceding the location of the exit port, applying at least one stream of heated fluid transversely to the filament so that it impinges thereon;
   (e) guiding the at least one stream of heated fluid so that it continues to impinge upon the filament as the filament moves from the preceding location to and through the exit port and into contact with the mandrel; and
   (f) applying an additional stream of heated fluid so that it impinges upon that portion of the mandrel surface which is about to be engaged by the filament, thereby heating the mandrel surface prior to its being contacted by the filament.

2. The method of utilizing a thermoplastic composite filament to form a structure, comprising the steps of:
   (a) selecting a mandrel having a surface whose configuration conforms to the desired shape of the structure;
   (b) selecting an applicator which is capable of guiding the filament into contact with the surface of the mandrel;
   (c) causing the filament to move longitudinally past the applicator;
   (d) causing the surface of the mandrel to move simultaneously and in a common direction with that portion of the filament which has already passed the applicator, such that the filament continuously comes into contact with the surface of the mandrel;
   (e) at a location preceding the location of the applicator, applying at least one stream of heated fluid to the filament so that it impinges thereon; and
   (f) guiding the at least one stream of heated fluid so that it continues to impinge upon the filament as the filament moves from the preceding location to the location of the applicator, and so that it also impinges upon both the mandrel and the filament in the region where the filament first comes into contact with the mandrel, thereby heating the mandrel prior to its being contacted by the filament.

3. In the art of utilizing a thermoplastic composite filament in conjunction with an applicator and a mold to form a structure, the method comprising the steps of:
   (a) causing the filament and the surface of the mold to move simultaneously and in a common direction relative to the applicator so that the filament is continuously fed from the applicator into engagement with the surface of the mold;
   (b) applying heated fluid to the filament so that it impinges thereon near the location of the applicator and along the length of the filament up to and including the region where the filament first comes into contact with the mold; and
   (c) concurrently applying heated fluid directly to the surface of the mold within the region where the filament first comes into contact with the mold so that the mold is heated prior to being contacted by the filament.

4. The method of claim 3 wherein heated fluid is also applied transversely to the filament at a location preceding the location of the applicator.

5. The method of claim 3 wherein heated fluid is also applied directly to that portion of the filament which has just been applied to the mold.

* * * * *